McCabe-Thiele Diagram for Case I

McCabe-Thiele Diagram for Case IIA

McCabe-Thiele Diagram for Case IIB $Y_A$ = MOL FRACTION OF COMPONENT A VAPOR OR LIQUID PHASE $X_A$ = MOL FRACTION OF COMPONENT A IN ADSORBED PHASE $Y_F$ = FEED COMPOSITION (MOL FRACTION OF COMPONENT A)

Feb. 22, 1955 I. KIRSHENBAUM ET AL 2,702,826
SEPARATION OF HYDROCARBONS
Filed Dec. 1, 1950 5 Sheets-Sheet 3

Isidor Kirshenbaum
Fredrick L. Jonach
Lewis D. Etherington
Inventors

By W. O. Heilman Attorney

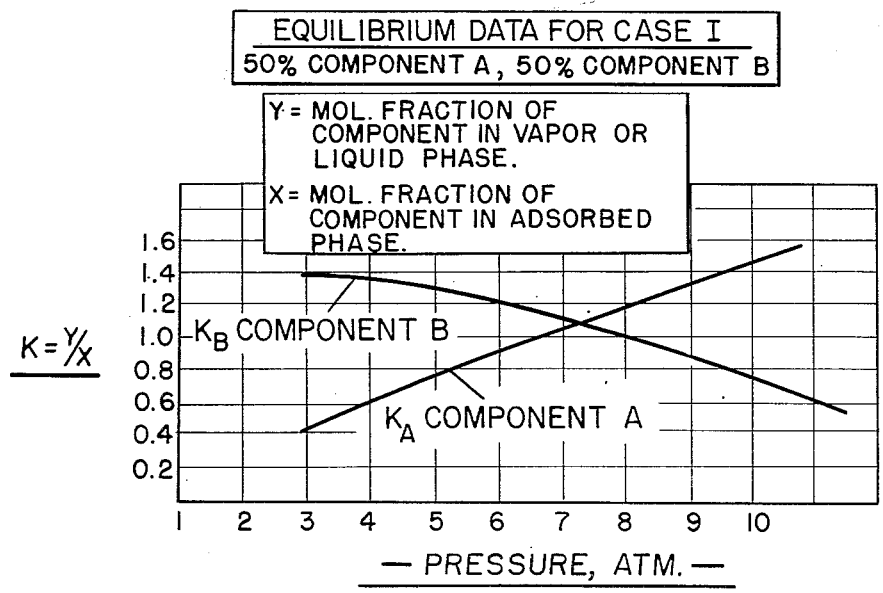
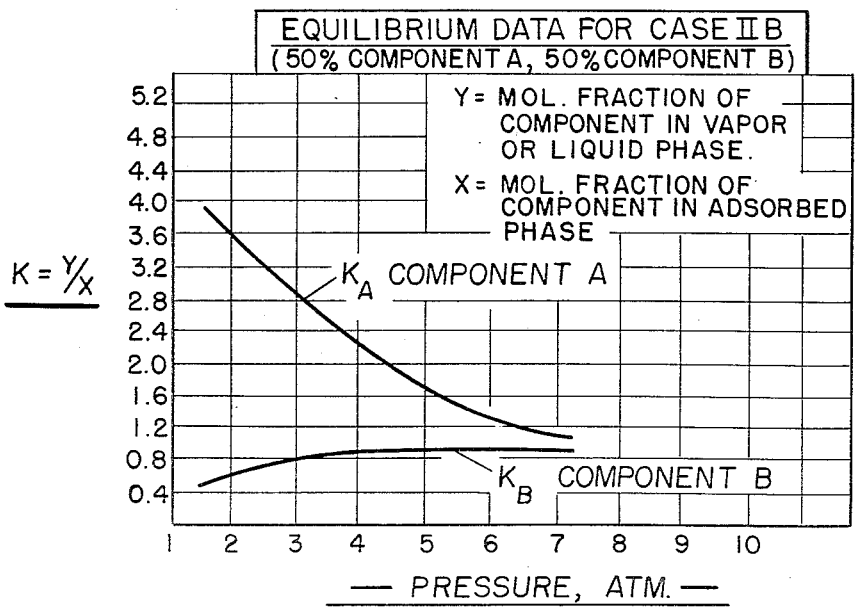

United States Patent Office 2,702,826
Patented Feb. 22, 1955

2,702,826

SEPARATION OF HYDROCARBONS

Isidor Kirshenbaum, Union, N. J., Fredrick L. Jonach, Richmond Hill, N. Y., and Lewis D. Etherington, Cranford, N. J., assignors to Standard Oil Development Company, a corporation of Delaware Application December 1, 1950, Serial No. 198,716

18 Claims. (Cl. 260—666)

This invention relates to the novel process of separating gaseous or liquid mixtures into their components and more particularly it relates to a novel method of carrying out an adsorption process wherein the use of an extraneous desorption medium such as steam is avoided, and adsorbent cooling, heating and dehydration is eliminated or minimized.

It is well known that selective adsorbents, such as activated carbon or silica gel, may be used to separate mixtures of gases and of liquids. However, the prior art processes have the disadvantage that at some point in the cycle of separations it becomes necessary to free almost completely the solid adsorbent from the more adsorbable feed mixture fraction. This desorption process usually involves a very high temperature or steam stripping operation with inherent disadvantages such as follows:

(1) The extraneous stripping agent such as steam is expensive and must be separated from the adsorber bottoms product.

(2) High temperatures are required in the desorption step in order to adequately regenerate the adsorbent. Losses of energy occur in removal of the stripping agent from the adsorbent before returning the adsorbent to the adsorption system.

(3) Difficulties are encountered in heat transfer between the solid adsorbent leaving the stripper and that entering the stripper.

(4) In using a selective adsorbent such as silica gel, together with steam stripping, difficulties are encountered in dehydrating the silica to a suitable level before returning the gel to the adsorption system.

It has now been found that these undesired high temperature desorption, adsorbent cooling and/or steam stripping operations in an adsorption process may be eliminated in the separation into fractions of liquid and/or gaseous mixtures by carrying out the process under varying temperature and pressure conditions.

Accordingly the present invention provides a means for separating fluid mixtures whose separation factor is a function of the thermodynamic variables temperature and pressure. The process of the present invention comprises broadly the contacting of such a fluid mixture at one temperature and pressure with a selective adsorbent in a first stage to form an unadsorbed phase and an adsorbent plus adsorbed phase, removing a portion of the unadsorbed phase as one product, and contacting in a second stage the adsorbent plus adsorbed phase with another portion of the unadsorbed phase at a different temperature and/or pressure to give a second unadsorbed phase and a second adsorbent plus adsorbed phase. For example, a mixture A—B is fed into an adsorption tower operated at a pressure $P_2$ and containing an adsorption section above the feed entry point and a rectification section below this point. Adsorbent containing the more adsorbable feed fraction B as adsorbate and a recycle of the less adsorbable overhead vapor fraction A are then compressed to a pressure $P_{12}$. This compression causes the two feed fractions to reverse in relative adsorptivity. The adsorbent after compression is then fed into the top of a second tower and the less adsorbed fraction is fed into the bottom of the same tower. Under these conditions component B is desorbed from the adsorbent and is replaced by the recycle portion of component A. Part of the desorbed component B is withdrawn as product and the remaining recycle portion is refluxed to the bottom of the first tower. The adsorbent containing mostly fraction A, as adsorbate, from the bottom of the second tower is re-fed to the top of the first tower.

The adsorbent will tend to rise in temperature approaching the bottom of the first tower due to concentration of the heavier fraction in the adsorbate. Also, the adsorbent will rise in temperature again after passing into the second tower due to greater adsorption at the elevated pressure. However, the adsorbent will return to its original temperature by the time it reaches the top of the first tower (without the need of an extraneous cooling medium) due to the desorption in the second tower. Thus the use of extraneous heating, cooling, and stripping media are avoided.

Alternate heating and cooling may sometimes be employed to effect the change in relative adsorptivity of the two feed fractions instead of a change in pressure. In fact, it may be desirable to operate with a gas phase in one tower and a liquid phase in the other tower. However, the temperature levels and magnitude of heat transfer will be less severe than with conventional desorption methods.

The process of the invention can be applied to the separation and purification of a wide variety of fluid mixtures. It is especially useful for separating and purifying hydrocarbon gases and liquids. For example, mixtures of methane and ethylene and of ethane and ethylene can be separated economically in order to provide concentrated ethylene for use as an alkylation feedstock or in the manufacture of chemicals. Normal paraffins can be separated from refinery streams, for example, n-hexane can be separated from a $C_6$ stream containing methylpentane and methylcyclopentane and then aromatized to form benzene, n-heptane can be separated from a gasoline fraction in order to improve octane number, and n-butane can be recovered from the products for recycling to a butane isomerization process. Aromatics can also be recovered in relatively pure form from mixture with isoparaffins and naphthenes, for example, benzene, toluene and xylene can be separated from hydroformates by the present process. Aromatic and other low quality constituents can be removed from lubricating oils to improve the viscosity index. Impurities can be separated from gases and liquids by the process, for example, water can be removed from ethylene, propylene, butylene and other feedstocks for polymerization and alkylation processes wherein catalyst activity requires careful control of water content. Also, the process is useful in the desulfurization of gases and liquids, for example, the removal of carbonyl sulfide from propane and the removal of hydrogen sulfide from coke oven gas. The process of the invention can also be used for separating non-hydrocarbon systems, for example, normal and branched chain alcohols, water and alcohols, water and ketones, ketones and alcohols, etc.

The manner in which the present process is carried out will be fully understood by the following description when read with reference to the following drawings in which:

Figure 7 is an equilibrium diagram for a two-component system in which a reversal of relative volatility occurs in the pressure range shown.

Figure 8 is an equilibrium diagram of a two-component system in which no reversal of volatility occurs in the pressure range shown.

Figure 1:
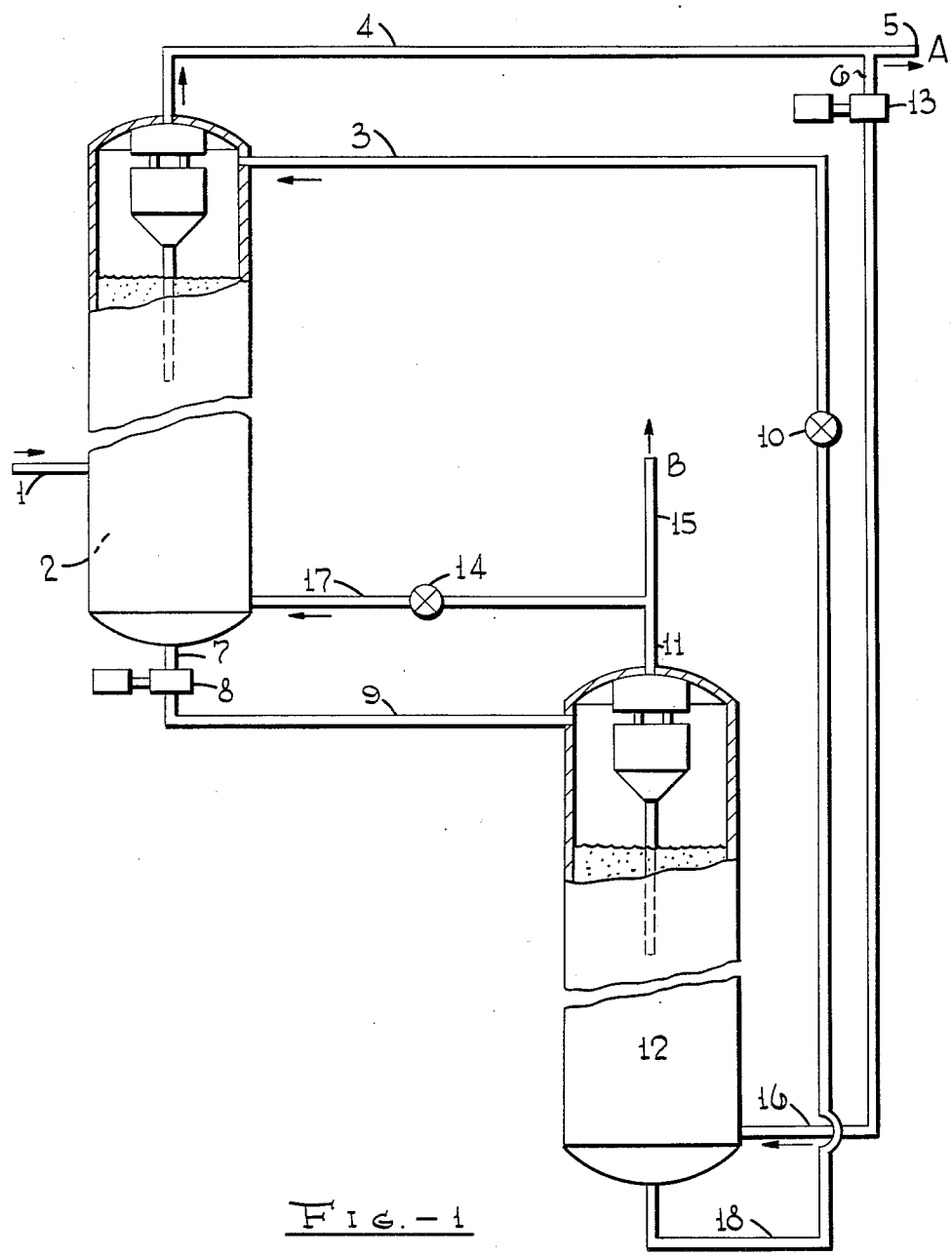
Figure 1 is a diagrammatic view of one embodiment of this invention wherein the density change is accomplished by a change in pressure.

Referring now to Figure 1, a feed containing equal parts of ethylene and ethane is fed into tower 2 via line 1. Tower 2 is operated at a pressure of 1.3 atm. The feed is passed countercurrently to the solid adsorbent which enters tower 2 via line 3. Using as adsorbent a mixture containing 0.87 lb. of silica gel per pound of charcoal, ethylene is the more volatile component. A gas stream rich in ethylene passes up through tower 2 and out through line 4. Part of this stream is taken as product via line 5. The remainder is passed through line 6, pressurized via compressor 13 and led via line 16 into the bottom of tower 12. This tower is operated at a pressure of 19.2 atm. The adsorbent containing adsorbed ethane is led from the bottom of tower 2 via line 7 into a pressurizing device 8, such as a multiple standpipe assembly as described in U. S. 2,311,564, and thence via line 9 into the top of tower 12. The adsorbent flows down tower 12 countercurrently to the ethylene enriched stream from line 16. As a result of this operation an ethane enriched stream leaves the top of tower 12 via line 11, and after depressurizing in valve 14 enters tower 2 by means of line 17. A part of this stream is removed as product via line 15. Product stream 15 may be taken off either before or after depressurizing while product stream 5 may, if so desired, be taken off on the high pressure side of the compressor 13. The adsorbent leaving tower 12 via line 18 is returned to tower 2 via line 3 after depressurization in valve 10 or other depressurizing device. It should be noted that this two-pressure system has the following advantages:

(1) No stripping agent or high temperatures are needed in order to recover two (or more) products in either gaseous or liquid form.

(2) Heat transfer problems are minimized, since it is required to remove from the system only heat involved in the compression of streams 6 and 7 and heat leakage from the surroundings.

Stream 11, 15 or 17 may undergo free expansion or be run through the impelling side of a gas turbine compressor for compressing stream 6. With the latter alternate, the expanding streams will perform maximum work and, therefore, a maximum fraction of the heat of compressing streams 6 and 7 will be removed from the adsorption system due to the work-expansion of streams 11, 15 and 17.

It is evident from the above description that the selective adsorbent has undergone one complete cycle and may undergo any number of additional cycles without complete removal of all adsorbed constituents in any part of the cycle. It follows that by the process of the present invention the selective adsorbent is never subjected to complete desorption such as that normally required in solid adsorption treating operations.

It should be noted that the relative pressures or temperatures of the two towers may be reversed to those used as examples for the present description. In such cases, the two feed fractions will be interchanged with respect to the points of withdrawal as products, etc. Thus, if one fraction is present in small quantity in the original feed as compared to the second fraction, it will be desirable that the former fraction be the bottoms product from tower 2 in order to minimize adsorbent circulation requirements. The relative pressures or temperatures of the two towers, therefore, would be controlled to take advantage of this principle.

These novel methods of mixture separation by adsorption may be carried out in the liquid and/or the gaseous phase for two or more mixture components whose separation factor varies with density, temperature or pressure.

In carrying out this novel process all of the selective adsorbent may be recycled from one operation to the other or a portion of the adsorbent can be removed periodically or continuously and subjected to a reactivation treatment such as steaming at high temperature, or it can be replaced with make-up adsorbent.

Any suitable type of adsorbent may be used in accordance with this invention. For example, coconut or wood charcoal, activated carbon from petroleum coke, silica gel, bauxite, activated alumina, and the like may be used. It is sometimes found convenient to use a mixed adsorbent in order to control the variations of relative adsorbtivity with pressure, temperature or density.

While the present invention has been described in connection with a continuous process involving removal of the selective adsorbent from the adsorption zone, it is within the scope of this invention to carry out the adsorptions on fixed beds of the adsorbent, reversing flow directions periodically to carry out the process described above. The continuous process using countercurrent movement of adsorbent and feed streams is, of course, greatly preferred. It is also within the scope of this invention to carry out the adsorption process in the presence of a finely divided adsorbent which is fluidized by the feed, recycle, or reflux streams. Moreover any other means known in the art may be used to obtain countercurrent flow or staging; e. g. a moving packed bed of larger particles, a solid adsorbent settling freely through a liquid, etc. In the case of a fluidized solids operation, bubble cap plates, perforated plates, or packed towers may be used.

Mixtures which may be separated in accordance with this invention can in general be classified into threte types.

Figure 2:
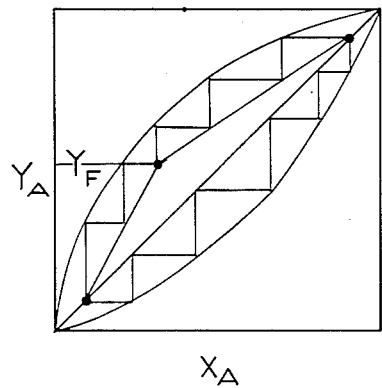
Figure 2 represents a McCabe-Thiele diagram for mixtures having a separation factor greater than unity at one density and less than unity at another.

*Case I.—Reversal of relative volatility.*—In this type of mixture the separation factor or relative volatility for the two key components is greater than unity at one temperature, pressure or mixture density and is less than unity at another temperature, pressure or mixture density. Relative volatility as used here is the same as conventionally defined in distillation and solvent extraction practices: equilibrium ratio of lighter to heavier components in the raffinate phase divided by the corresponding ratio for the extract phase. The adsorber-desorber operation for separation of this class of mixtures may be described by a diagram similar to the McCabe-Thiele diagrams (Ind. Eng. Chem. 17 605 (1925)) used in distillation. A generalized McCabe-Thiele diagram for this system is shown in Figure 2 for the separation of a two component mixture using two towers. The particular mixture illustrated has the molar composition 50%A and 50%B. In Figure 2 the upper set of curves are for the tower in which the separation factor is greater than unity while the lower set of curves are for the operation of the tower in which the separation factor is less than unity. Examples of this type of system may be seen from the following experimental data which are given for the sake of illustration, but without intention of limiting the invention thereto.

EXAMPLE I

A 50 cc. liquid mixture of 50 mol percent of normal heptane in methylcyclohexane was poured through a jacketed column containing 175 cc. of silica gel, at a number of temperatures ranging from —55 to 150° F. The composition of the first 4 cc. of the material percolated was determined and the following data were obtained:

| Temp., ° F. | Composition of percolated product, mol percent | |
|---|---|---|
| | n-heptane | methylcyclohexane |
| —55 | 31 | 69 |
| —15 | 35 | 65 |
| +20 | 45 | 55 |
| +50 | 49 | 51 |
| +80 | 56 | 44 |
| +130 | 59 | 41 |
| +150 | 61 | 39 |

The above data indicate that normal heptane is adsorbed to a greater degree at temperatures below 50° F., and that differential adsorption becomes very selective for the methylcyclohexane above 150° F, and for n-heptane below about 0° F.

EXAMPLE II

The adsorption isotherm for gaseous propane-water equilibrium were determined at 90 pounds per square inch pressure activated carbon as the adsorbent. As may be seen from the following experimental data the water is more volatile than propane at temperatures about 340° F., and less volatile at lower temperatures, viz. 290° F.

*Propane-water equilibrium on activated carbon*

[90 p. s. i. g.]

| Temp., ° F. | Relative Volatility (Propane/water) |
|---|---|
| 290 | 2.10 |
| 340 | 0.72 |
| 395 | 0.61 |

EXAMPLE III

The following data were obtained on a mixture of ethane and ethylene using silica gel, charcoal and mixtures of the two adsorbents:

*Ethylene-to-ethane equilibrium on adsorbents at 77° F.*

| Total Pressure | Relative Volatility | | | | |
|---|---|---|---|---|---|
| | Single Adsorbents | | Silica-Char Mixtures—#Silica/#Charcoal= | | |
| | Silica Gel | Charcoal | 1.41 | 0.87 | 0.65 |
| 1.3 Atm | 0.33 | 1.4 | 1.00 | 1.15 | 1.20 |
| 7.85 Atm | 0.56 | 1.25 | 0.92 | 1.00 | 1.04 |
| 19.2 Atm | 0.63 | 1.2 | 0.85 | 0.95 | 1.00 |

At 77° F. and 1.3 atm. pressure the ethylene-ethane system was found to have a relative volatility of 0.33 using silica gel as adsorbent and 1.4 using activated charcoal as adsorbent, i. e. ethylene is the more strongly adsorbed by silica gel and ethane is the more strongly adsorbed by charcoal. At 19.2 atm. pressure and 77° F. the relative volatilities were found to be 0.63 and 1.2 respectively. However upon making a mixed adsorbent containing 0.87 lb. of silica gel per pound of charcoal the following relative volatilities were obtained:

*Ethylene-ethane equilibrium on mixed adsorbent at 77° F.*

| Total Pressure, Atm. | Relative Volatility (Ethylene/Ethane) |
|---|---|
| 1.3 | 1.15 |
| 19.2 | 0.95 |

Thus at 1.3 atm. ethylene is the more volatile component while at 19.2 atm. ethane is the more volatile component.

*Case II.—Approach to reversal of relative volatilities.*

Figure 3:
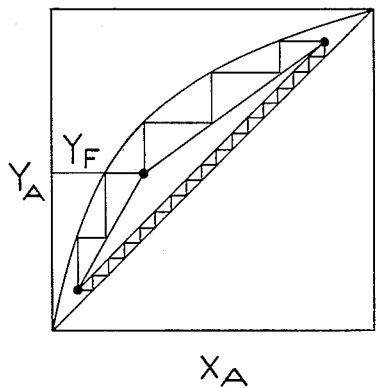
Figure 3 represents a McCabe-Thiele diagram for mixtures having a separation factor greater or less than unity at one density and unity at another.

*Case IIA.*—In this type of mixture the separation factor or relative volatility is greater (or less) than unity at one temperature, pressure and mixture density and is unity at another temperature, pressure, or mixture density. A generalized McCabe-Thiele diagram for this system is shown in Figure 3 for the separation of a two component system, having the molar composition of 50%A and 50%B, using two towers. In Figure 3 the upper set of curves are for the tower in which the relative volatility is greater than unity while the lower set of curves are for the tower in which the separation factor is unity. In Case IIA the same purity in the products can be obtained as in Case I, but it may require more stages as well as an increased adsorbent circulation rate. Examples of this type of system may be seen from the following data:

EXAMPLE IV

The adsorption isotherm of the propane-water system were determined at 90 pounds per square inch pressure using activated carbon as the adsorbent. The data are shown in the following table:

*Propane-water equilibria over activated carbon at 90 p. s. i. g.*

| Temp., ° F. | Relative Volatility (Propane/water) |
|---|---|
| 325 | 1.00 |
| 340 | 0.72 |

Similar data are obtained for the separation of water from olefin streams, as for example the propylene-water system.

EXAMPLE V

Another example of a system whose relative volatility varies as in Case IIA is the ethylene-ethane system using a mixed adsorbent consisting of silica gel and charcoal.

In this case the relative volatility varies markedly with pressure, as may be seen from the data in Example III. In this example are given the relative volatilities as a function of pressure for silica gel, charcoal and the mixtures of silica gel and charcoal. It is evident from these data that by proper control of the ratio of silica gel to charcoal it is possible to have either ethylene or ethane as the more volatile component and by this means minimize adsorbent circulation requirements.

Figure 4:
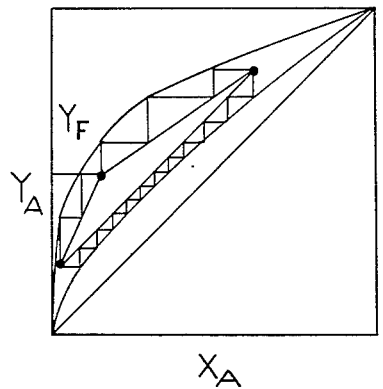
Figure 4 represents a McCabe-Thiele diagram for mixtures having a separation factor greater than unity for one density and close to but greater than unity at another.

*Case IIB.*—In this type of mixture the separation factor is greater than unity at one pressure, temperature, or mixture density and is closer to unity (but greater than unity) at another pressure, temperature or mixture density. A generalized McCabe-Thiele diagram for this system is shown in Figure 4 for the separation of a two component system, having the molar composition of 50% A and 50% B, using two towers.

There are a large number of mixtures whose variation of separation factor or relative volatility with temperature or pressure puts them into Class IIB. The relative volatilities for mixtures of methane, ethylene and propane, using activated carbon as adsorbent vary both with temperature and pressure.

EXAMPLE VI

Typical experimental data for a 50–50 mixture of methane-ethylene and of ethylene-propane are shown in the following table using activated carbon. It is apparent from the data that these binary mixtures may be separated by means of this invention by taking advantage of the change in relative volatility with temperature, with pressure, or with temperature and pressure.

*Effect of temperature and pressure on relative volatility*

| System | Pressure, p. s. i. g. | Temp., ° F. | Relative Volatility | |
|---|---|---|---|---|
| Methane-Ethylene | 30 | 77 | 10.5 | methane/ethylene. |
| | 30 | 175 | 8.4 | |
| | 90 | 175 | 6.3 | |
| Ethylene-Propane | 30 | 77 | 9.1 | ethylene/propane. |
| | 30 | 120 | 7.9 | |
| | 30 | 175 | 6.9 | |
| | 90 | 175 | 5.8 | |

EXAMPLE VII

Another example of this type of mixture is given by the following data for the separation of a mixture of ethane and ethylene by adsorption on silica gel at 77° F.

*Effect of pressure on relative volatility of ethane-ethylene system at 77° F.*

[Silica gel as adsorbent.]

| Pressure, atm. | Relative Volatility (Ethane/Ethylene) |
|---|---|
| 1.3 | 3.0 |
| 7.85 | 1.8 |
| 19.2 | 1.6 |

EXAMPLE VIII

The examples given so far have all been for either liquid phase or for vapor phase systems. However, it is not a requirement that the method of separation of this invention be applied to a separation carried out solely in the liquid phase or solely in the vapor phase. This invention can be applied with advantage to systems where the relative volatility or separation factor for the vapor phase adsorption is smaller than or greater than the separation factor for the liquid phase adsorption. An example of this type of system is shown by the following data for the separation of n-heptane and iso-octane mixture by adsorption on an activated carbon made from petroleum coke by steaming to a yield of 74 wt. per cent.

*Separation of n-heptane-isooctane mixture*
[50-50 mixture.]

| Temp., °F | 75 | 250. |
|---|---|---|
| Phase | Liquid | Vapor. |
| Relative Volatility $\frac{\text{n-heptane}}{\text{iso-octane}}$ | 3.5 | 1.9. |

EXAMPLE IX

Over a sample of another activated carbon, prepared by steaming petroleum coke to a yield of 83 wt. per cent, the following data were obtained:

*Separation of n-heptane-isooctane mixture*
[50-50 mixture.]

| Temp., °F | 75 | 227. |
|---|---|---|
| Phase | Liquid | Vapor. |
| Relative Volatility | 7.0 | 13.7. |

It is apparent that this type of mixture may be separated by the method disclosed in this invention.

In the above examples, the discussions have been in terms of "alpha," i. e., the fractionation factor or relative volatility. The "alpha" method of representing equilibrium data in fractionator design is used for greater convenience as compared to other methods of presenting data. Another method of representing equilibrium data is the K method. The definitions of K and $\alpha$ and the relationship between the two are shown by the following equations:

$$\alpha A-B = \frac{Y_A}{Y_B} \bigg/ \frac{X_A}{X_B} \text{ by definition} \quad \text{Eq. (1)}$$

$$K_A = Y_A/X_A \text{ by definition} \quad \text{Eq. (2)}$$

$$K_B = Y_B/X_B \text{ by definition} \quad \text{Eq. (3)}$$

$$\alpha A-B = K_A/K_B = \frac{Y_A}{X_A} \bigg/ \frac{Y_B}{X_B} \quad \text{Eq. (4)}$$

In Figure 7 are presented K data for Case I for the two component system A–B. In this example, the reversal of alpha occurs at about 7.3 atmospheres as shown by the fact that the two curves cross at this point. More complete data for this system at 6 and 10 atmospheres pressure are shown in Table I:

Table I.—*Equilibrium data for Case I*

| Pressure, Atm. | 6 | | | | 10 | | | |
|---|---|---|---|---|---|---|---|---|
| $Y_A$ | 20.0 | 40.0 | 60.0 | 80.0 | 20.0 | 40.0 | 60.0 | 80.0 |
| $Y_B$ | 80.0 | 60.0 | 40.0 | 20.0 | 80.0 | 60.0 | 40.0 | 20.0 |
| $X_A$ | 15.2 | 31.5 | 50.0 | 72.0 | 36.0 | 58.0 | 75.0 | 88.4 |
| $X_B$ | 84.8 | 68.5 | 50.0 | 28.0 | 64.0 | 42.0 | 25.0 | 11.6 |
| $K_A$ | 1.32 | 1.27 | 1.20 | 1.11 | 0.56 | 0.69 | 0.80 | 0.91 |
| $K_B$ | 0.94 | 0.88 | 0.80 | 0.71 | 1.25 | 1.43 | 1.60 | 1.72 |
| $\alpha A-B$ | 1.40 | 1.44 | 1.50 | 1.56 | 0.45 | 0.48 | 0.50 | 0.53 |
| $\omega$ | 2.94 | 2.88 | 2.82 | 2.76 | 3.11 | 3.3 | 3.2 | 3.1 |

In the above table,
$Y_A$ = mol per cent A in equilibrium vapor or liquid
$Y_B$ = mol per cent B in equilibrium vapor or liquid
$X_A$ = mol per cent A in equilibrium adsorbate
$X_B$ = mol per cent B in equilibrium adsorbate
$K_A = Y_A/X_A$
$K_B = Y_B/X_B$
$\alpha A-B$ = relative volatility, A to B
$\omega$ = total gm. mols of mixture adsorbed per 1000 gms. adsorbent In Figure 8 are presented K data for Case IIB for the two component system A–B. In this example there is no reversal of alpha in the pressure range shown. The curves do not cross but converge. More complete data for this system at 2 and 6 atmospheres pressure are shown in the following Table II:

Table II.—*Equilibrium data for Case IIB*

| Pressure, Atm. | 2 | | | | 6 | | | |
|---|---|---|---|---|---|---|---|---|
| $Y_A$ | 20.0 | 40.0 | 60.0 | 80.0 | 20.0 | 40.0 | 60.0 | 80.0 |
| $Y_B$ | 80.0 | 60.0 | 40.0 | 20.0 | 80.0 | 60.0 | 40.0 | 20.0 |
| $X_A$ | 4.2 | 10.2 | 19.7 | 38.8 | 15.2 | 31.5 | 50.0 | 72.0 |
| $X_B$ | 95.8 | 89.8 | 80.3 | 61.2 | 84.8 | 68.5 | 50.0 | 28.0 |
| $K_A$ | 4.75 | 3.92 | 3.04 | 2.06 | 1.32 | 1.27 | 1.20 | 1.11 |
| $K_B$ | 0.83 | 0.67 | 0.50 | 0.33 | 0.94 | 0.88 | 0.80 | 0.71 |
| $\alpha A-B$ | 5.69 | 5.85 | 6.08 | 5.27 | 1.40 | 1.44 | 1.50 | 1.56 |
| $\omega$ | 2.32 | 2.24 | 2.16 | 2.08 | 2.94 | 2.88 | 2.82 | 2.76 |

Figure 5:
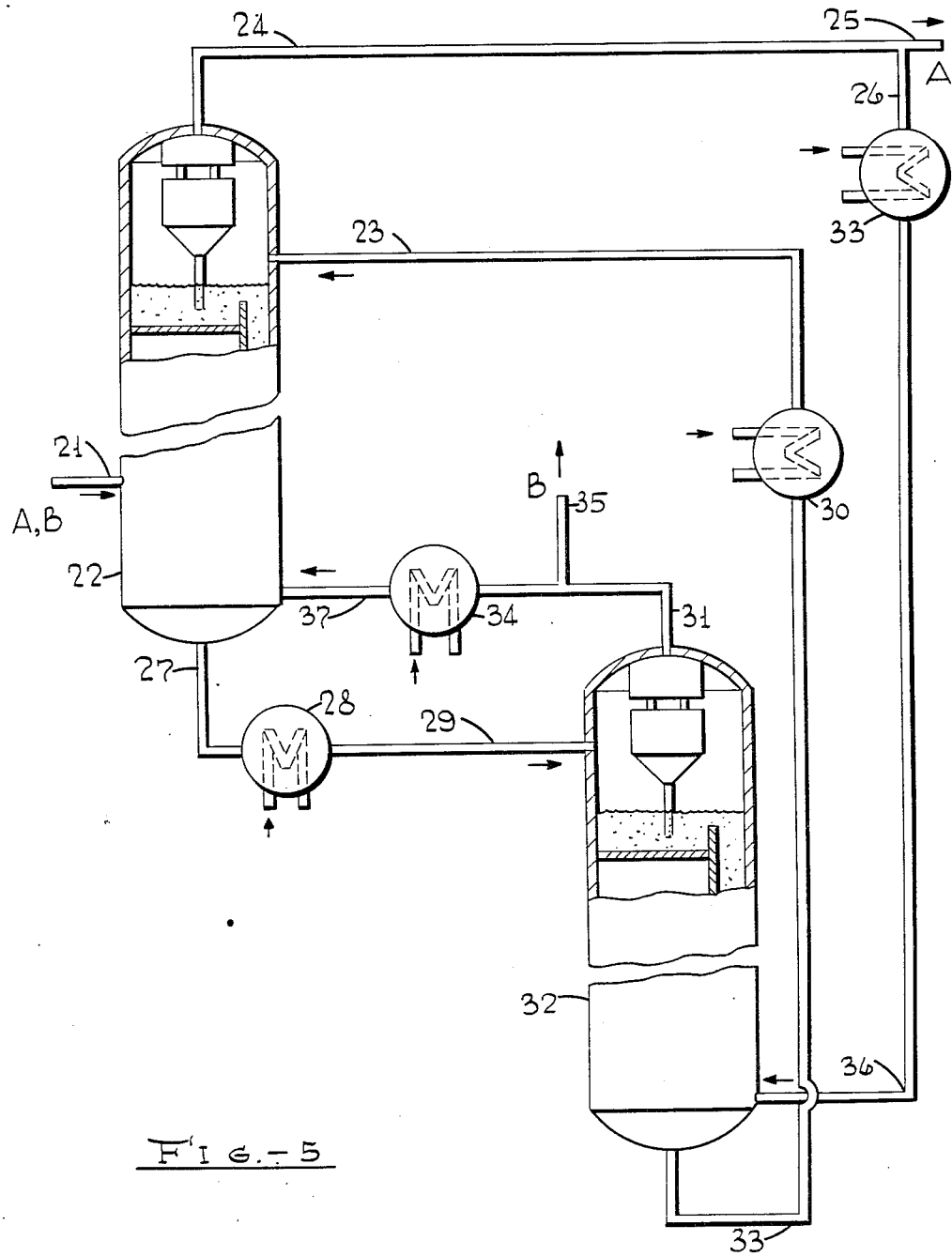
Figure 5 represents a diagrammatic view of another embodiment of the invention wherein the process is carried out with a fluidized solid adsorbent.

The manner in which this process is carried out will be fully understood by the following description when read with reference to Figure 5, using as a basis the data given previously for the n-heptane-methylcyclohexane mixture.

Referring therefore to Figure 5, a liquid mixture of n-heptane and methylcyclohexane is fed through line 21 into tower 22, into the top of which silica gel is introduced through line 23. Tower 22 is maintained at a temperature below 20° F., preferably at 0° F. The silica gel and hydrocarbon mixture pass countercurrently through the adsorption tower 22, so that the normal heptane in the feed is adsorbed on the silical gel at the top of the tower and is carried to the bottom of the tower, leaving tower 22 through line 27. Unadsorbed methylcyclohexane passes out of the top of tower 22 through line 24. A portion of the methylcyclohexane is removed as product via line 25 and the remainder is passed via line 26, heat exchanger 33 and line 36 into the bottom of column 32. The silica gel and adsorbed n-heptane from tower 22 is led through line 27, heat exchanger 28 and line 29 into the top of tower 32. Tower 32 is maintained above 100° F., preferably 150° F. The silica gel is then passed down column 32, countercurrently to the methylcyclohexane stream from line 36. During the operation the methylcyclohexane replace the n-heptane on the silica gel and as a result, the n-heptane passes up tower 32, out through line 31. A portion of the n-heptane is removed as product via line 35, and the remainder is passed through heat exchanger 34 and is returned to the bottom of tower 22 through line 37, where it acts as reflux. The silica gel and adsorbed methylcyclohexane passes down tower 32, out through line 33, through heat exchanger 30 and through line 23 into the top of tower 22. Both tower 22 and tower 32 can be of the plate design shown, or they can be packed with relatively coarse solids, for example, Raschig rings.

Liquid or solid legs or standpipes or slurry pumps may be used wherever pressurizing is required. Although the temperature differential between the two columns is relatively small, heat exchangers may be used to minimize energy losses. A number of these heat exchangers are shown in Figure 5. Thus, exchangers 28 and 30 may be a common heat exchanger for streams 27 and 33. When the heat capacity of the total solid adsorbent is large as compared to that of the liquid (or gas) streams the heat exchangers on the liquid (or gas) streams may be eliminated. Both towers are equipped with disengaging sections, baffles, etc. to facilitate separation of solid and liquid phases.

Thus by maintaining a temperature gradient between towers 22 and 32, there is no need to strip the selective adsorbent, since in tower 22 it is saturated with the component which is desorbed in tower 32, and in tower 32 it is saturated with the component which is desorbed in tower 22.

It is evident from the above description that the silica gel has undergone one complete cycle and may undergo any number of additional cycles without complete removal of all adsorbed constituents in any part of the cycle.

This example has been described with particular reference to the separation of n-heptane from methylcyclohexane. However, as was seen from the previously given data, the invention is not limited to such compounds but it is intended that the invention shall apply to the separation of paraffins from naphthenes and more generally to the separation of any mixture which falls in Class I, IIA or IIB.

Although the operation in the above example utilizes two towers, this invention is not restricted thereunto. More than two towers may be used whenever it is found advantageous to do so. Moreover, especially when carrying out a vapor phase separation, considerable savings in investment are indicated for combining the two towers into one as is shown by the next example, which utilizes the data for the propane-water system. The operation of this single tower unit may be best understood by reference to Figure 6.

Figure 6:
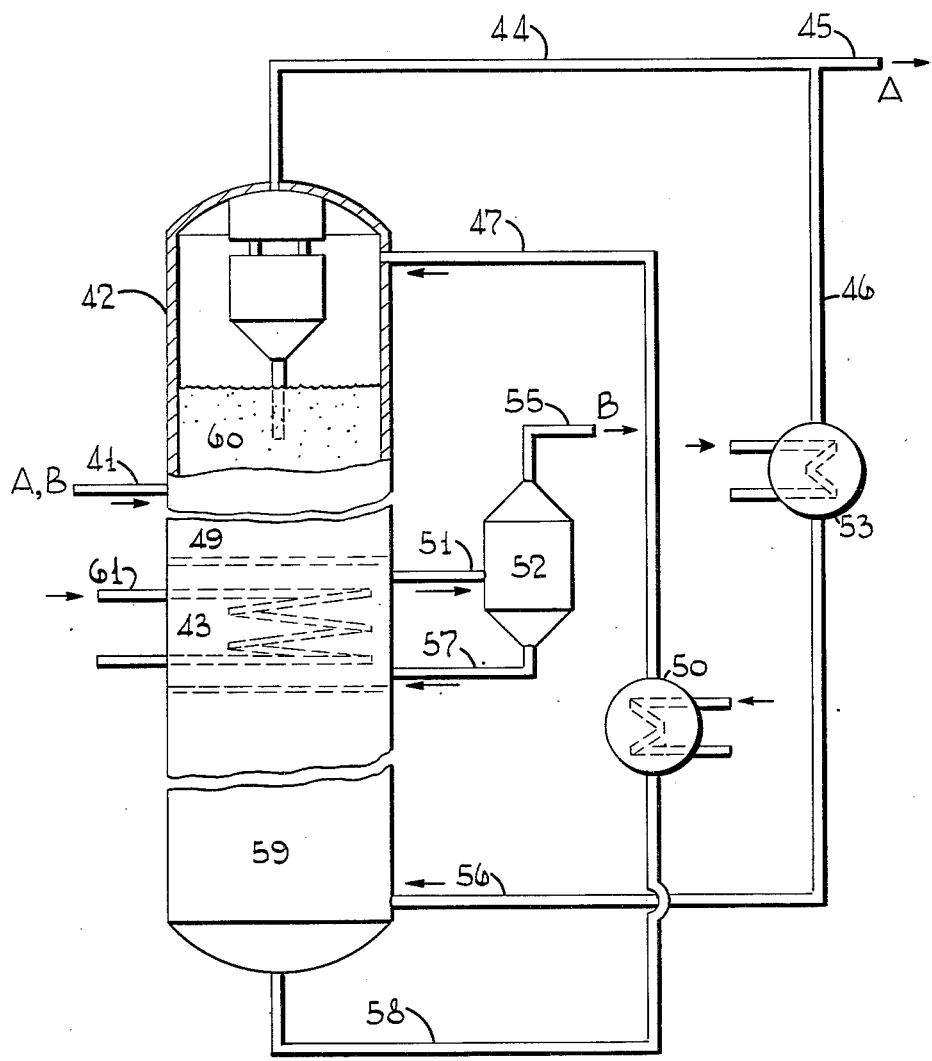
Figure 6 represents a diagrammatic view of an embodiment of the process of Figure 5 carried out in a single tower.

In Figure 6, tower 42 is a multiple bubble-cap plate type of column utilizing internal stage heating in section 43. The top section of the tower 60 is maintained at below 325° F., preferably at 300° F. or below. The bottom section 59 is maintained at a temperature of 325° F. or above, preferably at 350° F. or above. A vapor mixture of propane and water is fed through line 41 into tower 42, into the top of which activated carbon is introduced through line 47. The activated carbon and the hydrocarbon containing mixture pass countercuurrently through the adsorption tower 42 so that the water in the feed is adsorbed on the activated carbon in tower section 60 and is carried toward the bottom of the tower. Propane is stripped from the char in the tower section 49 by reflux water vapor. As the activated carbon passes through section 43 it is heated by heat exchange coils 61 to the temperature of the bottom of the column; viz 325° F. or greater, and a portion of the adsorbed product-plus reflux water is desorbed. The unadsorbed propane passes out to the top of tower 42 via disengaging sections, cyclones, etc. through line 44. A portion of the propane is removed as product via line 45 and the remainder is passed via lines 46, heat exchanger 53 and 56 into the bottom of section 59 of tower 42. The activated carbon containing adsorbed water is led from section 43 down through section 59, countercurrently to the propane stream from line 56. During this operation propane replaces water on the activated carbon and as a result water vapor passes up through section 59 into section 43. Some of this water is removed through line 59, cyclone 52 and line 55, the remainder passing upward into tower section 49 as reflux vapor. Any entrained adsorbent collected in cyclone 52 is returned to the tower through line 57. The water entering section 49 serves to displace propane on the activated carbon and the propane rises through sections 49 and 60 to line 44. The activated carbon and adsorbed propane in section 59 pass down the section, and through line 58, cooler 50 and line 47 into the top of section 60. Thus the activated carbon has undergone one complete cycle without removal of all adsorbed constituents in any part of the cycle.

It is also apparent that the operations described for the liquid phase separation in Figure 5 or the vapor phase separation in Figure 6 can be applied to any vapor-liquid-solid adsorption system such as the n-paraffin-isoparaffin separation over activated carbon; e. g. n-heptane-isooctane mixture. In this separation one tower in Figure 5 or one section of the tower in Figure 6 is operated in the liquid phase and the other in the vapor phase. For example in separating n-heptane and iso-octane using the operations shown in Figure 5, and operating at atmospheric pressure the temperature of tower 22 is maintained preferably below 95° F. while the temperature of tower 32 is maintained preferably above 225° F.

As a modification of the present invention the adsorbent and liquid or vapor phases may be heated and/or cooled at intermediate points within tower 12 (Fig. 1) as well as at locations of streams entering and leaving this tower. This modification of the process will effect one or more of the following advantages:

1. A decrease in the required adsorbent circulation rate.
2. A decrease in total tower stage requirements.
3. A decrease in the required amount of tower 2 overhead product which must be recycled (and, for example, compressed) as bottoms feed to tower 12.

An example of this modification of the invention may be had in the separation of ethane and ethylene with a mixture of activated silica gel and charcoal adsorbents, as described above. In this case tower 12 is operated at a higher pressure than tower 2 in order to effect the desired reversal in relative volatility between the two mixture constituents in the two towers. Under certain conditions of operation with no heating and cooling, tower 12 operation is controlling of the required char circulation and total stages. If cooling is now applied to the adsorbent and vapor at one or more points in the upper section of tower 12, the adsorbent circulation and stage requirement will be decreased. If cooling is the only additional operation carried out in tower 12, the adsorbent capacity for hydrocarbons in tower 12 and therefore the recycle portion of tower 2 overhead to the bottom would increase as a result of the cooling and the gas compression requirements would increase. Therefore, the adsorbent and vapor are heated at one or more points in the bottom section of tower 12 in order to reduce the adsorbent capacity and minimize the required recycle of tower 2 overhead gas to tower 12.

While the particular modifications which have been described operate with the adsorbent flowing downward, it will be understood that the invention embraces operation in the reverse manner.

The present invention has been described in detail for separations utilizing solid adsorbents, and it is in such processes that the invention is particularly useful. However, it is within the scope of this invention to utilize the principles thereof in operations such as extractive distillation, extraction, fractional distillation, vapor liquid adsorption, etc.

The nature and objects of the present invention having been thus fully set forth and specific examples of the same given, what is claimed as new and useful and desired to be secured by Letters Patent is:

1. A multi-stage process for the separation of fluid mixtures consisting of components A and B, whose relative volatility in the adsorbed phase is a function of a thermodynamic variable of the class temperature and pressure which comprises contacting the mixture in a first zone with a selective adsorbent at one set of temperature and pressure conditions to form an unadsorbed phase enriched in component A and a phase consisting of the adsorbent and the adsorbate enriched in component B, withdrawing a portion of the unadsorbed phase from the first zone as a first product, contacting the adsorbent and the adsorbate with the remaining portion of the unadsorbed phase in a second zone under a different set of temperature and pressure conditions, under which the relative volatility of component A to component B in the adsorbed phase is different from that in the first zone, to yield a second unadsorbed phase enriched in component B and a phase consisting of the adsorbent and second adsorbate enriched in component A, withdrawing a portion of the second unadsorbed phase from the second zone as a second product, and recontacting the remainder of the second unadsorbed phase and the adsorbent and the second adsorbate together with additional fresh feed in the first zone.

2. Process according to claim 1 wherein a temperature differential exists between the first and second zones.

3. Process according to claim 1 wherein a pressure differential exists between the first and second zones.

4. Process according to claim 1 wherein a temperature and pressure differential exists between the first and second zones.

5. Process according to claim 1 wherein the temperature and pressure conditions in the second zone are such that the relative volatility of component A to component B in the adsorbed phase is reversed from that in the first zone.

6. Process for separating a mixture of normal heptane and methylcyclohexane which comprises contacting the mixture in a first zone with silica gel at temperatures above about 50° F. to form an unadsorbed phase enriched in normal heptane and a phase consisting of the silica gel and the adsorbate enriched in methylcyclohexane, withdrawing a portion of the unadsorbed phase as a first product, contacting the silica gel and the adsorbate with the remaining unadsorbed phase in a second zone at a temperature below about 50° F., whereby the relative volatility of normal heptane and methylcyclohexane is reversed, yielding a second unadsorbed phase enriched in methylcyclohexane and a phase consisting of silica gel and a second adsorbate enriched in normal heptane, withdrawing a portion of the second unadsorbed phase as a second product and recontacting the remainder of the second unadsorbed phase and the silica gel and the second adsorbate together with additional fresh feed in the first zone.

7. Process according to claim 6 wherein the temperature in the first stage is maintained above 150° F. and that in the second stage below 0° F.

8. A process for separating water from propane which comprises contacting the propane-water mixture in a first zone with charcoal at temperatures below 325° F. and at 6 atmospheres pressure to form an unadsorbed phase enriched in propane and a phase consisting of the charcoal and the adsorbate enriched in water, withdrawing a portion of the unadsorbed phase enriched in propane as a first product, recontacting the charcoal and the adsorbate enriched in water with the remaining unadsorbed phase enriched in propane in a second zone at a temperature above 325° F. at 6 atmospheres pressure whereby the relative volatility of propane and water is reversed, yielding a second unadsorbed phase enriched in water and a phase consisting of charcoal and a second adsorbate enriched in propane, withdrawing a portion of the second unadsorbed phase as a second product and recontacting the remainder of the second unadsorbed phase and the charcoal and the second adsorbate together with additional fresh feed in the first zone.

9. Process for separating a mixture of ethane and ethylene which comprises contacting said mixture in a first zone with a mixed adsorbent consisting of .87 pounds of silica gel per pound of charcoal at a pressure of 1.3 atmospheres to form an unadsorbed phase enriched in ethylene and a phase consisting of the mixed adsorbent and the adsorbate enriched in ethane, withdrawing a portion of the unadsorbed phase as a first product, contacting the adsorbent and the adsorbate with the remainder of the unadsorbed phase in a second zone at a pressure of 19.2 atmospheres, whereby the relative volatility of the ethane and ethylene is reversed, yielding a second unadsorbed phase enriched in ethane and an adsorbed phase consisting of adsorbent enriched in ethylene, withdrawing a portion of the second unadsorbed phase as a second product and recontacting the remainder of the second unadsorbed phase and the adsorbent and the second adsorbate together with additional fresh feed in the first zone.

10. A multi-stage process for the separation of fluid mixtures consisting of components A and B, whose relative volatility in the adsorbed phase is a function of a thermodynamic variable of the class temperature and pressure which comprises contacting the mixture in a first zone with a selective adsorbent at one set of temperature and pressure conditions under which the relative volatility of component A to component B in the adsorbed phase is greater than 1.00 to form an unadsorbed phase enriched in component A and a phase consisting of the adsorbent and the adsorbate enriched in component B, withdrawing a portion of the unadsorbed phase from the first zone as a first product, contacting the adsorbent and the adsorbate with the remaining portion of the unadsorbed phase in a second zone under a different set of temperature and pressure conditions, under which the relative volatility of component A to component B in the adsorbed phase is 1.00 to yield a second unadsorbed phase enriched in component B and a phase consisting of the adsorbent and a second adsorbate enriched in component A, withdrawing a portion of the second unadsorbed phase from the second zone as a second product, and recontacting the remainder of the second unadsorbed phase and the adsorbent and the second adsorbate together with additional fresh feed in the first zone.

11. A process for separating water from propane which comprises contacting a propane-water mixture in a first zone with activated carbon at a temperature of 325° F. and at 6 atmospheres pressure whereby the relative volatility of propane to water is 1.00, to form an unadsorbed phase enriched in propane and a phase consisting of activated carbon and an adsorbate enriched in water, withdrawing a portion of the unadsorbed phase from the first zone as a first product, contacting the carbon and the adsorbate with the remaining portion of the unadsorbed phase in a second zone at a temperature of 340° F. and 6 atmospheres pressure whereby the relative volatility of propane to water is 0.72, yielding a second unadsorbed phase enriched in water and a phase consisting of activated carbon and a second adsorbate enriched in propane, withdrawing a portion of the second unadsorbed phase from the second zone as a second product, and recontacting the remainder of the second unadsorbed phase and the carbon and the second adsorbate together with additional fresh feed in the first zone to form said unadsorbed phase enriched in propane, and said phase consisting of activated carbon and an adsorbate enriched in water.

12. A process for separating ethane from ethylene which comprises contacting the ethane-ethylene mixture in a first zone with a mixed adsorbent consisting of 0.65 pounds of silica gel per pound of charcoal at a pressure of 1.3 atmospheres and a temperature of 77° F. whereby the relative volatility of ethylene to ethane is 1.20, yielding an unadsorbed phase enriched in ethylene and a phase consisting of the mixed adsorbent and the adsorbate enriched in ethane, withdrawing a portion of the unadsorbed phase as a first product, contacting the mixed adsorbent and the adsorbate with the remaining portion of the unadsorbed phase in a second zone under a pressure of 19.2 atmospheres and at a temperature of 77° F. whereby the relative volatility of the ethylene to ethane is 1.00 to yield a second unadsorbed phase enriched in ethane and a phase consisting of the mixed adsorbent and a second adsorbate enriched in ethylene, withdrawing a portion of the second unadsorbed phase from the second zone as second product, and recontacting the remainder of the second unadsorbed phase and the mixed adsorbent and the second adsorbate together with additional fresh feed in the first zone.

13. A multi-stage process for the separation of fluid mixtures consisting of components A and B, whose relative volatility in the adsorbed phase is a function of a thermodynamic variable of the class temperature and pressure which comprises contacting the mixture in a first zone with a selective adsorbent at one set of temperature and pressure conditions under which the relative volatility of component A to component B in the adsorbed phase is greater than unity, to form an unadsorbed phase enriched in component A and a phase consisting of the adsorbent and the adsorbate rich in component B, withdrawing a portion of the unadsorbed phase from the first zone as a first product, contacting the adsorbent and the adsorbate with the remaining portion of the unadsorbed phase in a second zone under a different set of temperature and pressure conditions, under which the relative volatility of component A to component B in the adsorbed phase is closer to unity than that in the first zone, yielding a second unadsorbed phase enriched in component B and a phase consisting of the adsorbent and a second adsorbate enriched in component A, withdrawing a portion of the second unadsorbed phase from the second zone as a second product, and recontacting the remainder of the second unadsorbed phase and the adsorbent and the second adsorbate together with additional fresh feed in the first zone.

14. A process for separating a mixture of methane and ethylene which comprises contacting said mixture in a first zone with activated carbon at a pressure of 30 pounds per square inch and a temperature of 77° F. whereby the relative volatility of the methane to ethylene is 10.5 to form an unadsorbed phase enriched in methane and a phase consisting of the activated carbon and an adsorbate enriched in ethylene, withdrawing a portion of the unadsorbed phase as a first product, recontacting the activated carbon and the adsorbate with the remaining portion of the unadsorbed phase in a second zone at a pressure of 90 pounds per square inch and a temperature of 175° F., whereby the relative volatility of methane to ethylene is 6.3, yielding a second unadsorbed phase enriched in ethylene and a phase consisting of activated carbon and a second adsorbate enriched in methane, withdrawing a portion of the second unadsorbed phase as a second product and recontacting the remainder of the second unadsorbed phase and the activated carbon and second adsorbate, together with additional fresh feed in the first zone.

15. Process for separating a mixture of ethylene and propane which comprises contacting the mixture in a first zone with activated carbon at a pressure of 30 pounds per square inch and a temperature of 77° F., whereby the relative volatility of ethylene to propane is 9.1, to form an unadsorbed phase enriched in ethylene and a phase consisting of the activated carbon and the adsorbate enriched in propane, withdrawing a portion of the unadsorbed phase as a first product, contacting the activated carbon and the adsorbate with the remainder of the unadsorbed phase in a second zone at a pressure of 90 pounds per square inch and at a temperature of 175° F., whereby the relative volatility of the ethylene to propane is 5.8, yielding a second unadsorbed phase enriched in propane and a phase consisting of activated carbon and the adsorbate enriched in ethylene, withdrawing a portion of the second unadsorbed phase as a second product and recontacting the remainder of the second unadsorbed phase and the activated carbon and second adsorbate together with additional fresh feed in the first zone.

16. Process for separating a mixture of ethane and ethylene which comprises contacting said mixture in a first zone with silica gel at a pressure of 1.3 atmospheres and a temperature of 77° F. whereby the relative volatility of ethane to ethylene is 3.0, to form an unadsorbed phase enriched in ethane and a phase consisting of the silica gel and the adsorbate enriched in ethylene, withdrawing a portion of the unadsorbed phase as a first product, contacting the adsorbent and the adsorbate with the remainder of the unadsorbed phase in a second zone at a pressure of 19.2 atmospheres, and a temperature of 77° F., whereby the relative volatility of the ethane and ethylene is 1.6, yielding a second unadsorbed phase enriched in ethylene and an adsorbed phase consisting of adsorbent enriched in ethane, withdrawing a portion of the second unadsorbed phase as a second product and recontacting the remainder of the second unadsorbed phase and the adsorbent and the second adsorbate together with additional fresh feed in the first zone.

17. Process for the separation of a fluid mixture consisting of components A and B, whose separation factor is a function of a thermo-dynamic variable of the class temperature and pressure which comprises feeding the mixture at an intermediate point into a column containing an adsorbent, maintaining the top of the column at one set of temperature and pressure conditions under which component A is more volatile than component B and the bottom of the column at another set of temperature and pressure conditions under which component B is more volatile than component A, passing the mixture countercurrent to the adsorbent, withdrawing an unadsorbed phase enriched in component A from the top of the column, recycling a portion of said unadsorbed phase to the bottom of the column, withdrawing adsorbent from the bottom of the column and withdrawing a phase enriched in component B from an intermediate point of the column.

18. A multi-stage process for the separation of fluid mixtures consisting of components A and B, whose relative volatility in the adsorbed phase is a function of a thermodynamic variable of the class temperature and pressure which comprises contacting the mixture in a first zone with a selective adsorbent at one set temperature and pressure conditions under which the relative volatility of component A to component B in the adsorbed phase is 1.00 to form an unadsorbed phase enriched in component A and a phase consisting of the adsorbent and adsorbate enriched in component B, withdrawing a portion of the unadsorbed phase from the first zone as a first product, contacting the adsorbent and the adsorbate with the remaining portion of the unadsorbed phase in a second zone under a different set of temperature and pressure conditions, under which the relative volatility of component A to component B in the adsorbed phase is less than 1.00 to yield a second unadsorbed phase enriched in component B and a phase consisting of the adsorbent and a second adsorbate enriched in component A, withdrawing a portion of the second unadsorbed phase from the second zone as a second product, and recontacting the remainder of the unadsorbed phase and the adsorbent and the second adsorbate together with additional fresh feed in the first zone to form said unadsorbed phase enriched in component A and said phase consisting of adsorbent and an adsorbate enriched in component B.

References Cited in the file of this patent

UNITED STATES PATENTS

| | | |
|---|---|---|
| 2,472,250 | Hirschler | June 7, 1949 |
| 2,548,192 | Berg | Apr. 10, 1951 |
| 2,548,502 | Small | Apr. 10, 1951 |